United States Patent [19]
Kang

[11] Patent Number: 5,748,259
[45] Date of Patent: May 5, 1998

[54] SCREEN SIZE CONTROL CIRCUIT ACCORDING TO A POWER ON OR OFF CONDITION OF A TELEVISION

[75] Inventor: Kwon-Hag Kang, Seoul, Rep. of Korea

[73] Assignee: Daewoo Electronics Co., Ltd., Seoul, Rep. of Korea

[21] Appl. No.: 655,165

[22] Filed: May 30, 1996

[30] Foreign Application Priority Data

| May 30, 1995 | [KR] | Rep. of Korea | 95-13764 |
| May 30, 1995 | [KR] | Rep. of Korea | 95-13765 |
| May 30, 1995 | [KR] | Rep. of Korea | 95-13766 |
| May 30, 1995 | [KR] | Rep. of Korea | 95-13767 |
| May 30, 1995 | [KR] | Rep. of Korea | 95-13779 |

[51] Int. Cl.$^6$ .................................................. H04N 3/24
[52] U.S. Cl. ...................... 348/634; 348/704; 348/730
[58] Field of Search ................................ 348/634, 635, 348/704, 730; H04N 3/24

[56] References Cited

U.S. PATENT DOCUMENTS

| 4,021,849 | 5/1977 | Wheeler | 358/165 |
| 5,089,898 | 2/1992 | Kim | 358/335 |
| 5,220,426 | 6/1993 | Karlock | 348/634 |
| 5,471,251 | 11/1995 | Inaba et al. | 348/634 |

FOREIGN PATENT DOCUMENTS 262409 9/1992 United Kingdom ........... H04N 5/265

*Primary Examiner*—Glenton B. Burgess
*Attorney, Agent, or Firm*—Beveridge, DeGrandi, Weilacher & Young LLP

[57] ABSTRACT

Disclosed is a screen size control circuit for controlling the screen size of a television according to a power state by using a blanking control signal synchronized by a horizontal or vertical synchronizing signal when a television is being turned on or off. The screen size control circuit includes a signal processing section for generating a composite video signal capable of displaying a TV broadcasting signal received from an antenna, a control signal generating section for controlling a blanking width by generating a blanking control signal increasing or decreasing linearly according to the power condition, and a display section for displaying the composite video signal according to the blanking control signal. As such, the blanking width is modified according to the constitution of the blanking control signal generating section and the inputted synchronizing signal so that the screen opening and closing effect is obtained, and thus eye strain is reduced.

26 Claims, 12 Drawing Sheets

POWER OFF

POWER OFF

POWER ON

VERTICAL SYNC.

POWER ON

HORIZONTAL SYNC.

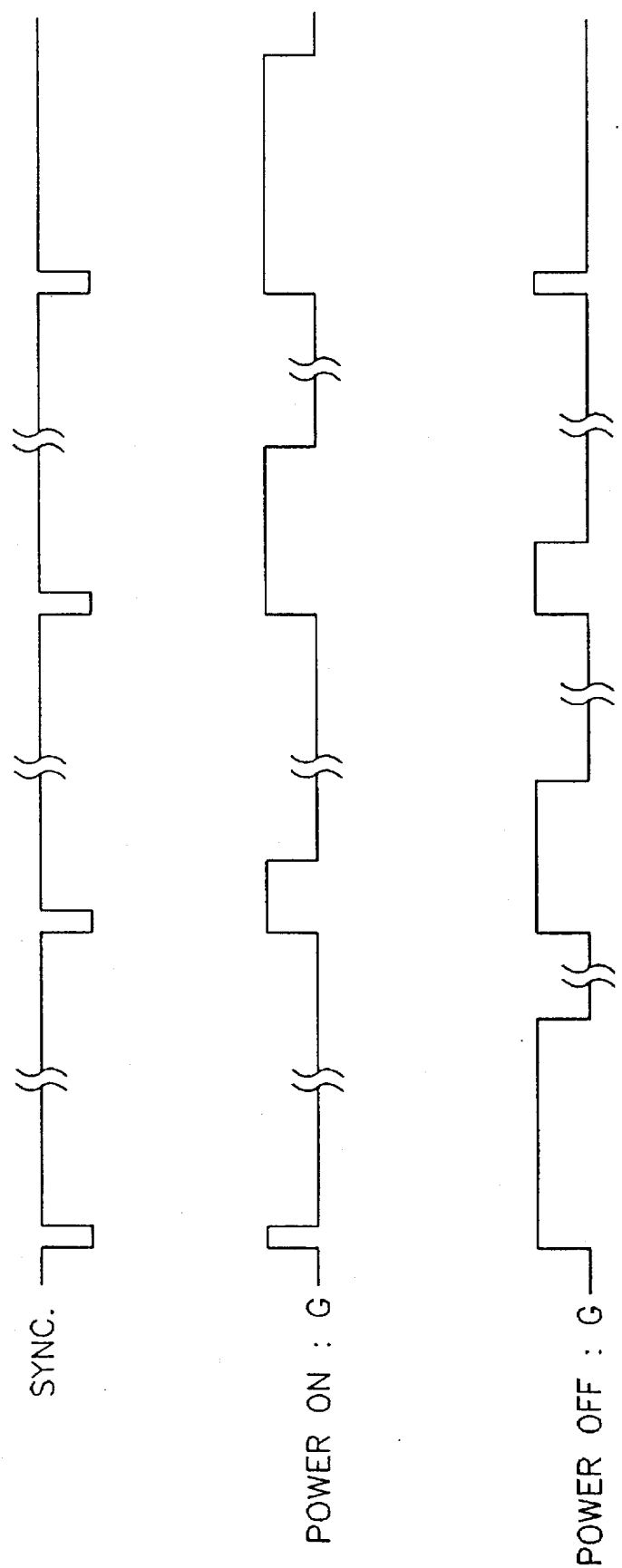

POWER OFF

POWER OFF

POWER ON

HORIZONTAL SYNC.

POWER ON

VERTICAL SYNC.

FIG.10
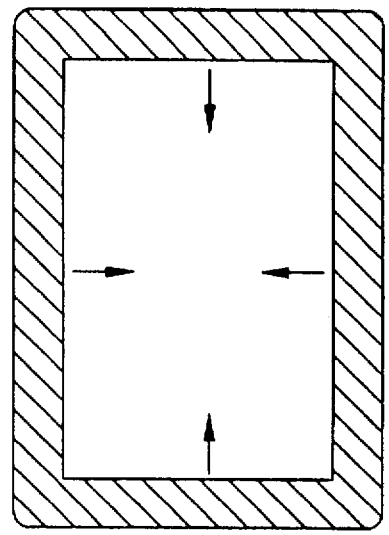
POWER OFF
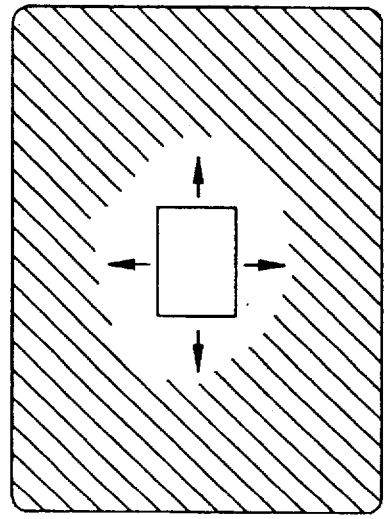
POWER ON

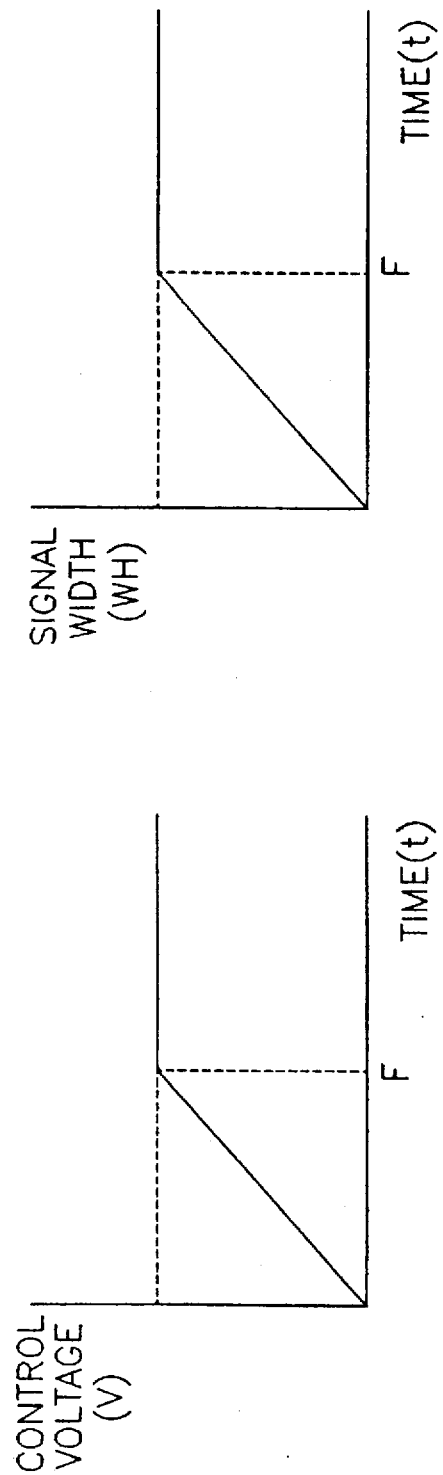

SCREEN SIZE CONTROL CIRCUIT ACCORDING TO A POWER ON OR OFF CONDITION OF A TELEVISION

BACKGROUND OF THE INVENTION

1. Field of the Invention

This invention relates to a circuit for controlling a screen size according to the power on or off condition, and more particularly, to a circuit for controlling the screen size by controlling a blanking width according to a blanking control signal synchronized by a horizontal or vertical synchronizing signal when a power turns on or off.

2. Description of the Prior Art

As known, a video reproducing processing system of a television is divided into VHF (very high frequency) and UHF (ultra high frequency) according to a receiving frequency band. The video reproducing processing system of the conventional television having the above construction comprises a tuner, a video intermediate frequency (IF) amplifying section, a video detecting section, a video amplifying section, a synchronizing signal taking off section, and a horizontal/vertical deflection circuit section.

The tuner detects a television radio wave of designated broadcasting channel according to a channel selecting control signal of a control section (not shown) and amplifies the television radio wave. Also, the tuner mixes a high frequency signal from an antenna and a local oscillating signal and outputs a signal having a low frequency component [i.e, an intermediate frequency (video 58.75 MHz, sound 54.25 MHz)].

The video IF amplifying section comprises several amplifiers and amplifies the signal outputted from the tuner for displaying the signal in a screen. Also, the video IF amplifying section amplifies a carrier color signal which is included in a high band of a video signal for reproducing a color without distortion.

The video detecting section detects a composite video signal (e.g., having a luminance signal, the carrier color signal, and the horizontal or vertical synchronizing signal) without distortion from the amplified intermediate frequency signal. Also, the video detecting section excludes a sound signal by using a 54.25 MHz or 4.5 MHz trap because the sound signal is not used in a video signal reproducing and thus a disturbance bit generation is suppressed.

The video amplifying section detects the luminance signal and the color signal from the composite video signal, controls a luminance and a contrast of the detected luminance signal, demodulates the detected color signal, and outputs a color converted RGB signal for reproducing a color video signal by using a matrix circuit. The synchronizing signal taking off section detects the horizontal and vertical synchronizing signal from the detected composite video signal.

The horizontal/vertical deflection circuit section generates a horizontal/vertical deflection signal according to a driving signal, supplies a high voltage through a flyback transformer (FBT) to an anode of a monitor, controls a retrace period of the horizontal/vertical deflection signal, and outputs a DC voltage by rectifying a retrace signal generated according to the horizontal/vertical deflection operation. The outputted DC voltage is used in a portion of the power.

The operation of the video reproduction processing system of the conventional television as described in the foregoing will now be explained.

If a viewer selects a channel, the signal of the broadcasting channel tuned by a tuner is supplied to the video IF amplifying section and a signal having a designated value is obtained by amplifying the broadcasting signal. The amplified signal is inputted to the video detecting section. The video detecting section detects the composite video signal from the intermediate frequency signal. The composite video signal comprises the luminance signal, the carrier color signal, and the synchronizing signal.

The video amplifying section divides the composite video signal into the luminance signal and the color signal and operates the designated signal processing operation. The luminance signal and the color signal are converted to a RGB signal in the matrix circuit. The RGB signal is displayed in the screen, when the video amplifying section outputs the luminance signal, the deflection circuit section generates a horizontal retracing signal and a horizontal retracing blanking signal (BLK) for controlling a retracing period of the horizontal retracing signal. The BLK signal is synchronized by the horizontal synchronizing signal. The BLK signal mixed with the luminance signal is supplied to the monitor.

The display of the video reproducing system is the conventional television monitor having an aspect ratio 4:3. The conventional television monitor can display the video signal in the screen, but does not provide a visual screen size having a verisimilitude or a reality.

Thus, at present, we use a monitor being used in wide TV having an aspect ratio 16:9 for providing the dynamic and realistic visual screen size. The visual screen size enlarged in the horizontal direction is displayed in the screen. The visual screen size enlarged in the horizontal direction is obtained by converting the vertical saw wave form for driving a vertical deflection operation into the vertical parabola form.

But, in the above described monitor having an aspect ratio 4:3 or 16:9, if the power turns on, an audio and a video signal are muted during the predetermined period until the high voltage is generated inside the monitor. If the high voltage is generated, the visual screen size having a full size is suddenly displayed in the screen. Also, if the power turns off, the high voltage is exhausted. If the high voltage is exhausted, the displayed visual screen size is suddenly disappeared from the screen. In result, the screen is suddenly opened or closed when power turns on or off and thus the viewer has a feeling an eye strain. Thus, a lot of devices have been developed to gradually open and close the screen according to the power on or off condition.

One of the conventional screen size control circuits is a circuit for controlling the screen size by generating a pulse width modulation (PWM) signal according to the control of MICOM in a deflection control circuit system. The PWM signal is filtered by the low pass filter (LPF). Also, the LPF generates a deflection control signal for controlling the horizontal/vertical defletion signal. The horizontal/vertical deflection circuit is controlled by the deflection control signal. Thus area of the screen displayed visual screen size is controlled. In other words, if the horizontal/vertical deflection current is increased or decreased, then a deflection angle of an electron beam radiated in the monitor is controlled. If the deflection angle is increased, then the screen size is increased and if the deflection angle is decreased, then the screen size is decreased. The control circuit controls the screen size with maintaining the whole image shape displayed in the screen. Thus the circuit doesn't provide the visual screen size having the reality.

One of the conventional screen size control circuits is a screen control circuit automatically decreasing the visual screen size by gradually enlarging at least one margin of the screen. The margin is generated by the graphic software. Thus the circuit must be use a graphic processor unit.

SUMMARY OF THE INVENTION

Thus, the present invention is proposed to solve the problems. It is an object of the present invention to provide a screen size control circuit by controlling the blanking according to the power on or off condition. The blanking is a margin which does not display the video signal when the video signal is synchronized by the horizontal/vertical synchronizing signal.

The screen size control circuit according to the present invention comprises a signal processing section for generating a composite video signal which can be display the television radio waves received from the antenna in the screen; a control signal generating section for generating a control voltage according to the power on or off condition and for generating the composite video signal controlled the blanking by generating the blanking control signal synchronized by the synchronizing signal; and a display section for displaying the composite video signal having the controlled blanking.

The signal processing section comprises a video amplifying section, a synchronizing signal taking off section, and a video signal processing section. The signal amplifying section amplifies the television radio wave received from the antenna to the signal having a predetermined magnitude for displaying the television signal in the screen. The synchronizing signal taking off section detects the horizontal and vertical synchronizing signal from the amplified video signal. The video signal processing section generates a composite video signal by processing the magnitude and color of the video signal.

The control signal generating section comprises a MICOM, an integrator, a blanking control signal generating section, and a blanking width controlling section. The MICOM generates a PWM signal increasing or decreasing linearly according to the power on or off condition. The PWM signal is used to control the screen size. The integrator generates a control voltage by integrating the PWM signal. The blanking control signal control section generates a blanking control signal synchronized by the synchronizing signal according to the control voltage.

The blanking width controlling section generates a composite video signal controlled in the blanking width by processing the blanking control signal and the composite picture signal. The composite video signal controlled blanking width is displayed in the screen. Thus, the visual screen size is changed according to the blanking control signal.

In the screen size control circuit in accordance with the invention, the blanking control signal generating section generates a blanking control signal when power turns on or off and controls the visual screen size by controlling the blanking width. As such, the screen opening or closing effect is obtained by controlling the screen size according to the power on or off condition and thus eye strain is reduced.

BRIEF DESCRIPTION OF THE DRAWINGS

Other features and advantages of the present invention will be more fully understood from the following detailed description of the preferred embodiment, the appended claims, and the accompanying drawings, in which:

FIG. 6 shows a signal waveform of the output terminal of the blanking control signal generating section according to the first and second embodiments of the present invention;

FIG. 10 shows a monitor state according to the fifth embodiment of the present invention;

FIG. 11A is a graph showing the change of the control voltage to the time when power turns on according to the present invention;

FIG. 11B is a graph showing the change of the blanking control signal width to the time when power turns on according to the present invention;

DETAILED DESCRIPTION OF THE PREFERRED EMBODIMENTS

The preferred embodiments of the present invention will now be described in more detail with reference to the accompanying drawings.

Figure 1:
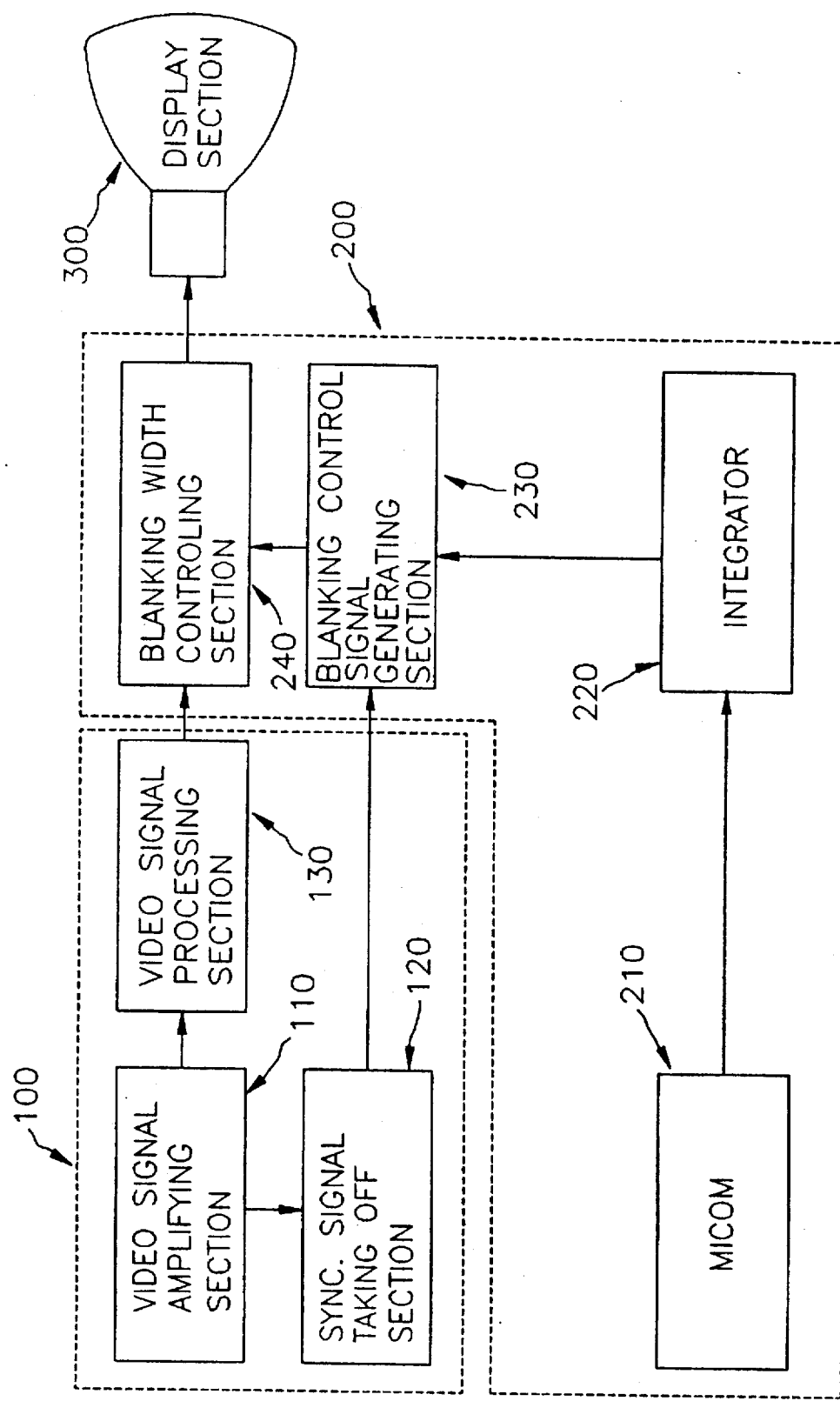
FIG. 1 is a block diagram showing the screen size control circuit according to the present invention.

In FIG. 1, the screen size control circuit according to the present invention generates the composite video signal controlled in blanking by mixing the composite video signal and the blanking control signal. The screen size controlling circuit comprises a signal processing section 100 for generating the composite video signal displaying the television broadcasting signal received from the antenna in the screen, a control signal generating section 200 for generating the control voltage linearly changed by the power condition and for generating the composite video signal controlled in blanking width by generating the blanking control signal synchronized by the synchronizing signal, and a display section 300 for displaying the composite picture signal controlled in the blanking width.

First, a MICOM 210 generates a PWM signal having a width increasing or reducing linearly according to the power on or off condition. The PWM signal is used for controlling the screen size. A integrator 220 generates the control voltage by integrating the PWM signal. The control voltage controls the blanking width.

On the other hand, a picture amplifying section 110 amplifies the television signal received from the antenna to the signal having a predetermined magnitude for displaying the signal. A synchronizing signal taking off section 120 detects and divides the horizontal and vertical synchronizing signal from the amplified video signal. A blanking control signal generating section 230 generates the blanking control signal synchronized by the synchronizing signal according to the control voltage. A video signal processing section 130 generates the composite picture signal by processing a magnitude and color of the video signal for displaying the amplified video signal in the screen.

A blanking width controlling section 240 is connected to the display section 300 displaying the composite video signal controlled in the blanking width according to the blanking control signal.

Figure 2:
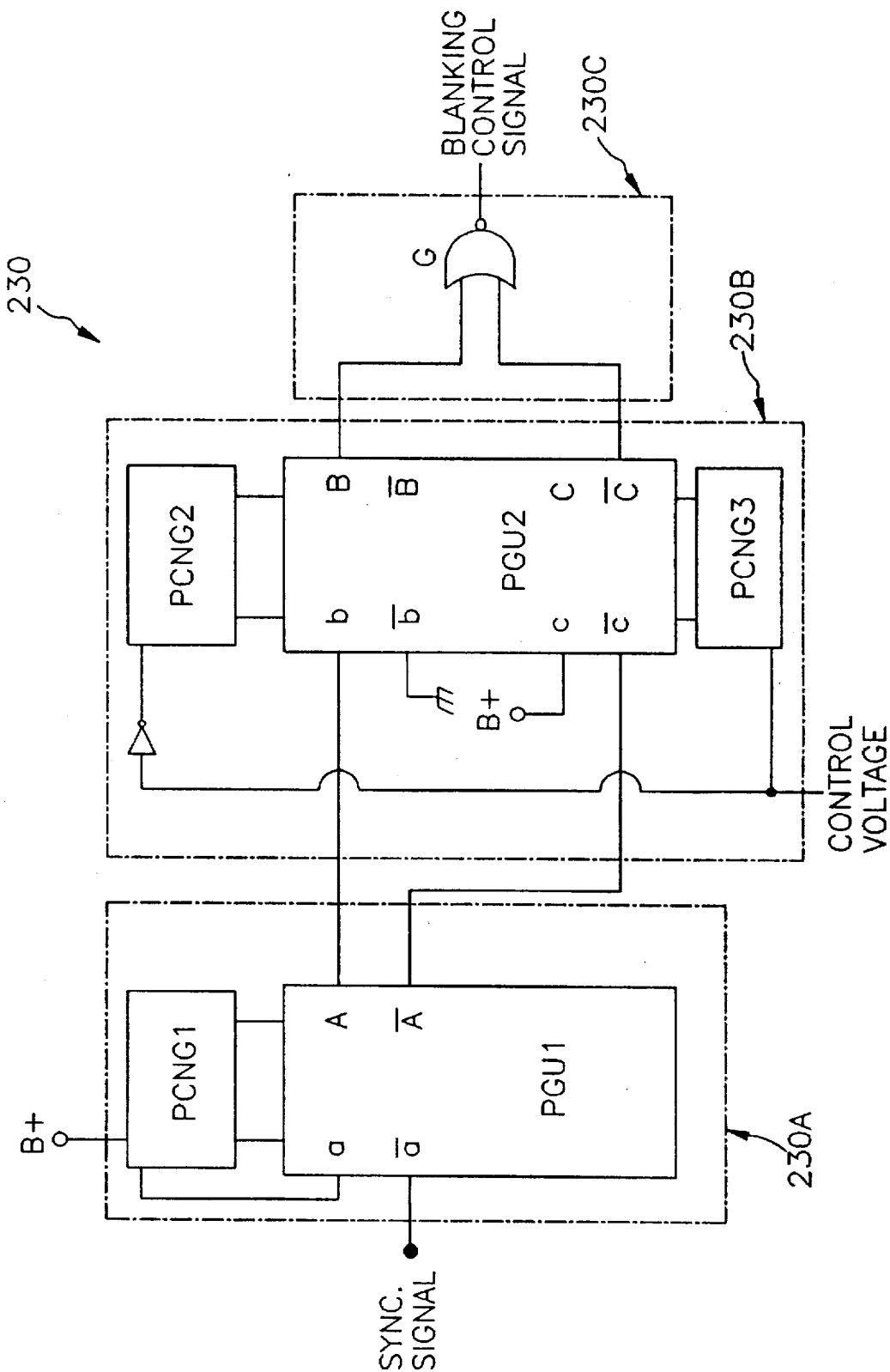
FIG. 2 shows a blanking control signal generating section according to the first and second embodiments of the present invention.
Figure 3:
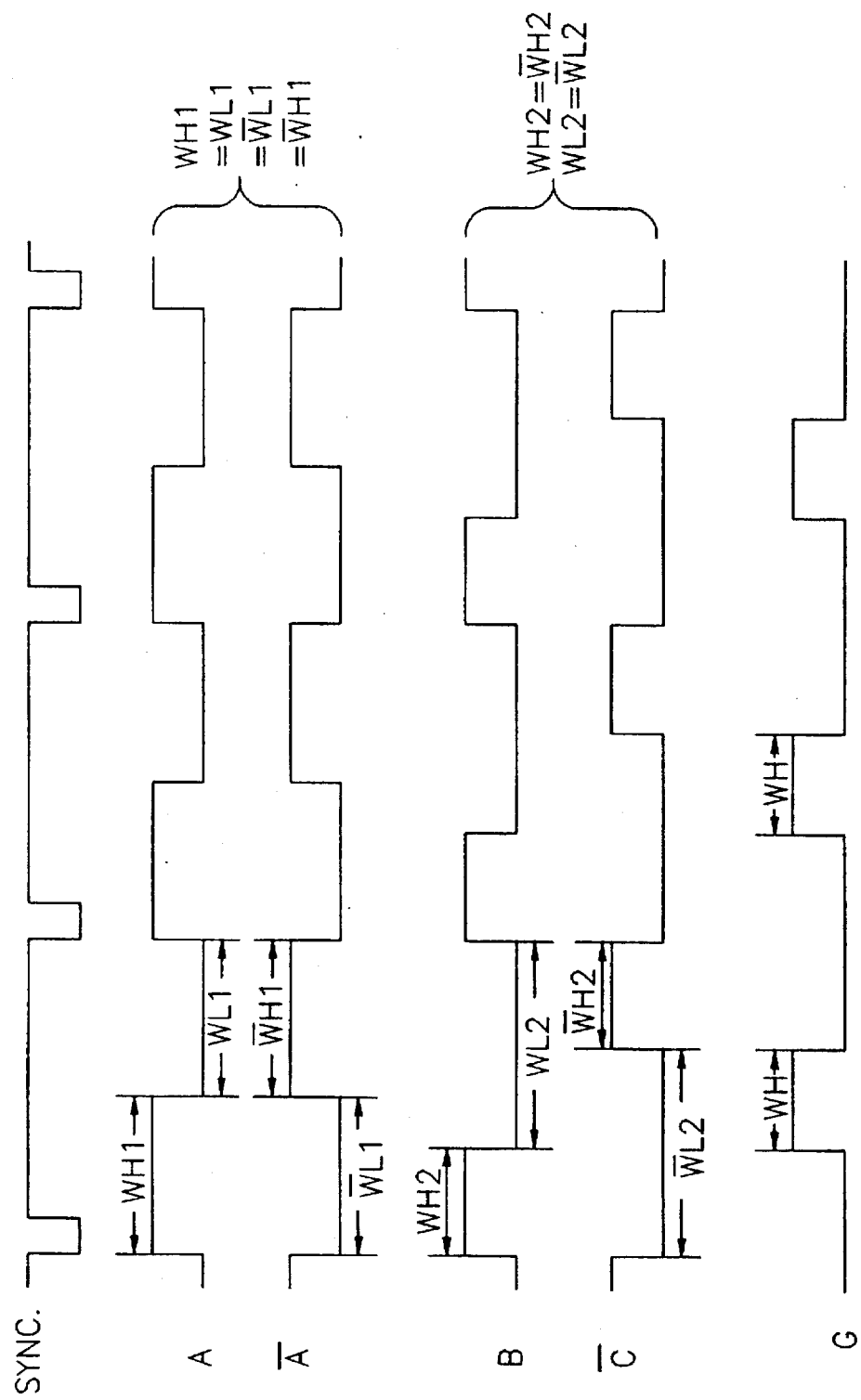
FIG. 3 shows a signal waveform of each output terminal according to the first and second embodiments of the present invention.

FIG. 2 shows a blanking control signal generating section according to the first embodiment and the second embodiment of the present invention. The blanking control signal generating section 230 comprises a first signal generating section 230A for generating a first signal and an inverse first signal both synchronized by the synchronizing signal, a second signal generating section 230B for generating a second signal and an inverse second signal from the first signal and the inverse first signal, and a logic section 230C for generating a blanking signal by logical processing the second signal and the inverse second signal.

The first signal generating section 230A comprises a first signal generating unit PGU1 and a first signal width detecting section PCNG1 for determining the width of the first signal. The second signal generating section 230B comprises a second signal generating unit PGU2 for generating a second signal and an inverse second signal from the first signal and the inverse first signal, an inverter for inverting the control voltage inputted from integrator 220, second signal width determining section PCNG2 for determining the width of the second signal according to the inverted control voltage, and a third signal width determining section PCNG3 for determining the inverse second signal according to the control voltage. Logical section 230C generates a blanking control signal by logical processing of the second signal and the inverse second signal.

First signal width determining section PCNG1, second signal width determining section PCNG2, and third signal width determining section PCNG3 are RC circuits and logical processing section 230C is a NOR gate in this embodiment. Especially, second signal width determining section PCNG2 and third signal width determining section PCNG3 have the same time constant for displaying the composite video signal having the controlled blanking from the center of the screen to both sides of the screen during a power on condition.

Now we will describe operations and effects in the screen size control circuit having the above construction according to the first embodiment of the present invention.

First, when the power of the wide television is on, MICOM 210 supplies a tuned control voltage to the tuner (not shown) for tuning a television broadcasting signal of a predetermined channel. The television broadcasting signal is tuned in the tuner and amplified with the intermediate frequency. The video detected broadcasting signal processes the composite video signal which can be displayed in the screen by using the video signal processing method in video signal processing section 130. The composite video signal processed by the video signal processing method is supplied to blanking width controlling section 240. Also, the amplified video signal is inputted to synchronizing signal taking off section 120.

Synchronizing signal taking off section 120 detects and divides a vertical synchronizing signal from the amplified video signal. Detected vertical synchronizing signal is supplied to the first signal generating unit PGU1 for generating first signal. First signal generating unit PGU1 outputs the first signal and the inverse first signal. The first signal and the inverse first signal are synchronized by the down edge which direction is going down (hereinafter referred to as 'down edge') of the high level of the vertical synchronizing signal and toggled by the down edge of the vertical synchronizing signal.

On the other hand, before the control voltage controlled by MICOM 210 is supplied to second signal generating unit PGU2, second signal generating unit PGU2 outputs the second signal and the inverse second signal. The duty ratio of high level to low level of both signals WH2:WL2, /WH2:/WL2 are 50:50. The duty ratio is defined by first resistor R1 and first capacitor C1. The second signal and the inverse second signal have a low level by inputting the second signal and the inverse second signal to NOR gate 230C.

Blanking width controlling section 240 maintains the switching off state by blanking control signal having a low level. Thus composite video signal does not display in the screen.

Then, if MICOM 210 generates the PWM signal increasing the signal width for controlling the screen size. Integrator 220 outputs the control voltage. The control voltage is supplied to second signal generating unit PGU2 for controlling the width of the inverse second signal and to the second signal generating unit PGU2 through inverter for controlling the width of the first signal.

Because the control voltage which is supplied to the second signal determining section PCNG3 is inverse in the inverter, the high level period WH2 of the second signal is started at the front down edge of one period of the vertical synchronizing signal and the high level period /WH2 of the inverse second signal is finished at the rear down edge of the same period. Thus, the high level period WH of the output of NOR gate 230C has a symmetrical form in reference to the center of one period of the vertical synchronizing signal.

If control voltage is increased, then the high level width of the second signal and the inverse second signal WH2, /WH2 are reduced. Thus the high level width of blanking control signal is increased.

If blanking control signal increased in high level width is supplied to blanking width controlling section 240, the one period of the switching 'on' acting is increased. In accordance with the increased in the switching 'on' period, the area displaying the composite video signal controlled blanking width is increased in the screen.

On the other hand, MICOM 210 has a predetermined changing range of the width of the high level of the PWM signal. In this embodiment, the upper limited value of width of high level of PWM signal is determined by making the screen of displaying section 300 to have a full size. When power is 'on', if the high level width of PWM signal is the upper limited value of changing range, the high level width of PWM signal is maintained at the upper limited value. Thus, as shown in FIG. 11A, we obtain a predetermined control voltage (after F point in FIG. 11A). If predetermined control voltage is supplied to the blanking control signal generating section 230, the blanking control signal in accordance with the control voltage is generated.

Figure 4B:
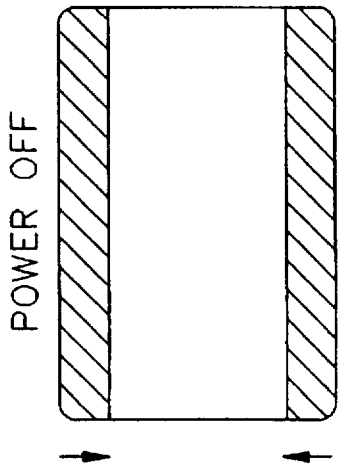
FIGS. 4A-4D show a monitor state according to the first and second embodiments of the present invention.
Figure 4D:
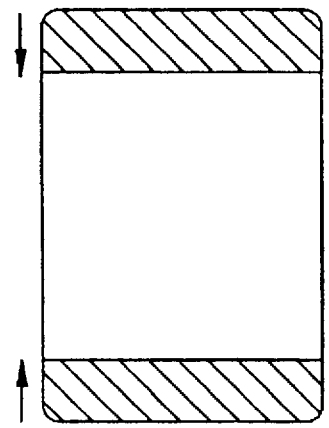
Figure 4A:
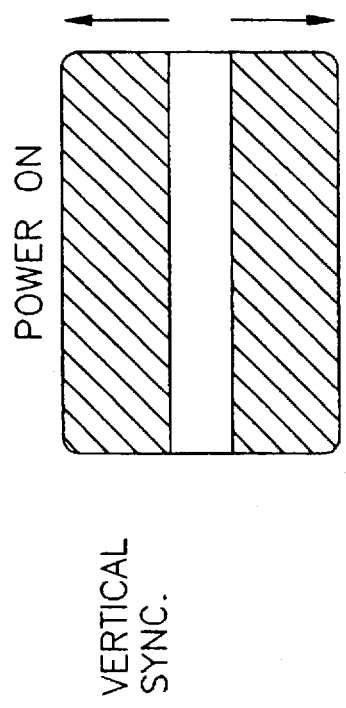
Figure 4C:
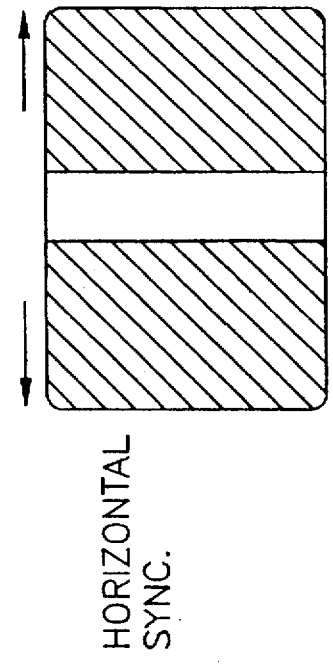

Because the first signal is synchronized with the vertical synchronizing signal, the composite video signal controlled blanking bar is displayed by reducing its width in vertical direction (indicated by arrow in FIG. 4A) in reference to the horizontal line in the center of the screen as shown in FIG. 4A.

Figure 12A:
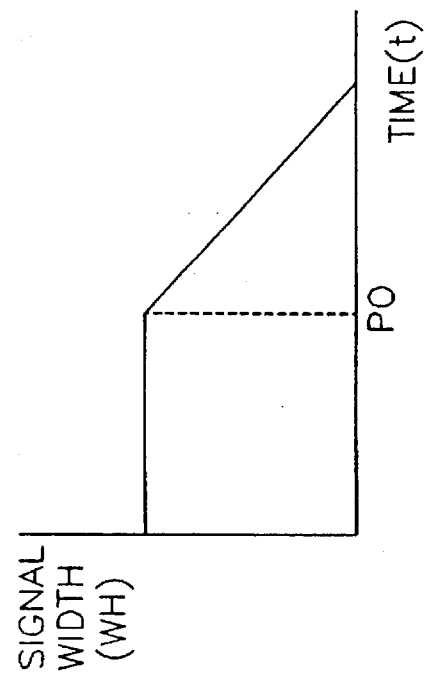
FIG. 12A is a graph showing the change of the control voltage to the time when power turns off according to the present invention.
Figure 12B:
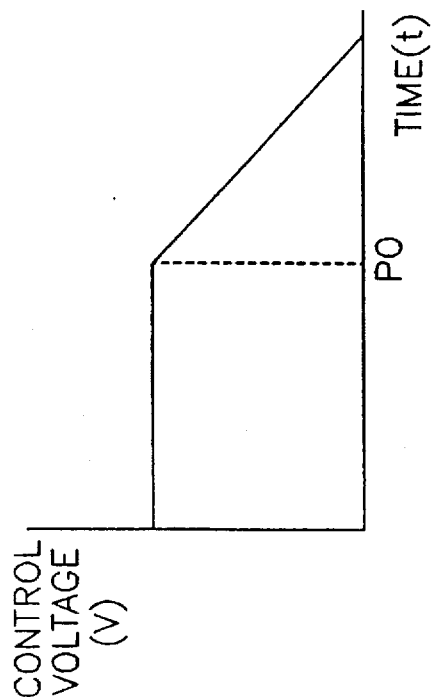
FIG. 12B is a graph showing the change of the blanking control signal width to the time when power turns off according to the present invention.

On the other hand, if power of a wide television changes the 'on' condition to the 'off' condition (indicated PO point in FIG. 12A, 12B), MICOM 210 generates the PWM signal for linearly reducing the control voltage V. The reduced control voltage V as shown in FIG. 12A is obtained by integrating the PWM signal. Control voltage and inverted control voltage in the inverter are supplied to second signal generating section 230B. The second signal and the inverse second signal having the high level width of each signal WH2, /WH2 are generated according to the supplied control voltage. The high level width WH of the blanking control signal is reduced because the second signal and the inverse second signal are processed by logical processing in logic section 230C.

The period of switching 'on' of blanking width controlling section 240 is gradually reduced by the blanking control signal. If the period of switching 'on' is reduced, the width of the blanking in the screen of displaying section 300 is increased in horizontal direction in the center of the screen because the blanking control signal is synchronized. If the width of blanking is increased, then the screen is shown as closing by covering the displayed video.

If the screen of displaying section 300 is completely closed, that is, PWM control signal isn't generated any more because of ending the linearly reducing state of the PWM control signal, MICOM 210 controls the power to change the off state.

According to the first embodiment of the present invention as in the above construction, when power is on or off, the visual fatigue of viewer caused by suddenly opening or closing the screen can be reduced because the blanking width is controlled by the blanking control signal. Also, to display the composite video signal controlling the blanking width has a similar effect as opening and closing the curtain of a stage.

The description of the construction and operation of blanking control signal generating section 230 in accordance with the second embodiment of the present invention is omitted because the construction and operation is the same as the construction and operation of blanking control signal generating section 230 in accordance with the first embodiment of the present invention. Merely, the blanking width is changed in a horizontal direction in reference to the vertical axis in the center of the screen because the blanking control signal in the screen size control circuit in accordance with the second embodiment is synchronized with the horizontal synchronizing signal. In the same way, blanking control signal is generated in accordance with the increase of the control voltage when power is turned on. The blanking width is controlled by reducing the width in the horizontal direction by the blanking control signal. Thus, the area displayed composite video signal is increase in the screen. On the other hand, when power of wide television is turned off, the switching on period of the blanking width controlling section 240 is gradually reduced. As shown in FIG. 4D, the blanking width is increased from both sides of the screen to the center of the screen. Thus the area displayed in the video is reduced in the screen.

The blanking width has a maximum value by finishing the linearly reduction of the PWM signal. Then, the video displayed in the screen disappears from the screen. MICOM 210 controls the turning off of the power.

According to the second embodiment of the present invention as in the above construction, the present invention has an effectiveness for opening or closing the screen by controlling the blanking width in horizontal direction in reference to vertical axis in accordance with the blanking control signal when power is turned on or turned off. Thus, the visual fatigue of a viewer that is caused by suddenly opening or closing the screen can be reduced.

Figure 5:
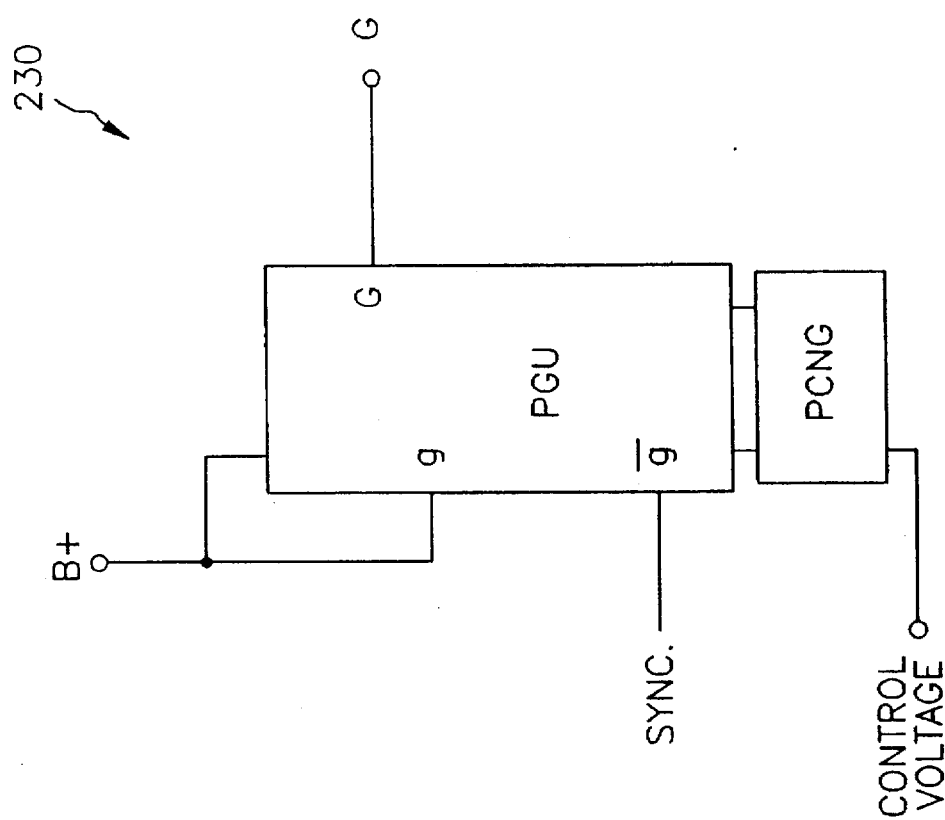
FIG. 5 shows a blanking control signal generating section according to the third and forth embodiments of the present invention.

FIG. 5 shows a blanking control signal generating section in accordance with the third and forth embodiments of the present invention.

Blanking control signal generating section 230 comprises a signal generating unit PGU for generating the blanking control signal synchronized with synchronizing signal and a signal width determining section PCNG1 for determining the signal width of blanking control signal in accordance with the control voltage. Signal width determining section PCNG1 in the present embodiment is RC circuit.

Now, the operation and effectiveness of the screen size control circuit in accordance with the third embodiment in the above description is described below.

First, when power is turned on, the description of the operation until the control voltage V in accordance with control signal by the MICOM 210 is supplied to the blanking control signal generating section 230 is omitted from description because it has the same operation of the first embodiment.

The integrated control voltage in accordance with controlling by MICOM 210 when power is turned on is supplied to the signal generating unit PGU through the signal width determining section PCNG1. The high level width WH of signal is increased in proportion to an increase in the control voltage V from the integrator 220 because the signal width determining section PCNG1 has a predetermined RC time constant. Thus the high level width WH of signal can be represented by multiplying the control voltage V by an RC time constant.

FIG. 6 shows a wave form of the blanking control signal increasing its high level width WH. The signal generating unit PGU is synchronized and toggled with down edge of high level of the vertical synchronizing signal. The generated blanking control signal is outputted to the blanking width controlling section 240. Then blanking width controlling section 240 generates a composite video signal having a reduced blanking width. Thus, the switching on period of the blanking width controlling section 240 is increased.

Figure 7B:
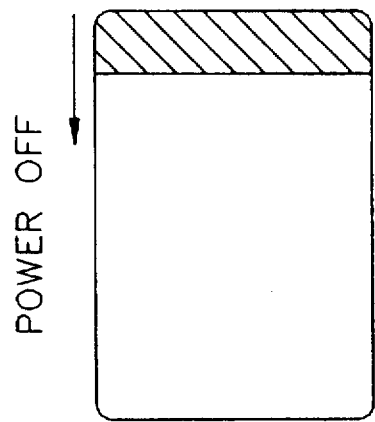
FIGS. 7A-7D show a monitor state according to the third and forth embodiments of the present invention.
Figure 7D:
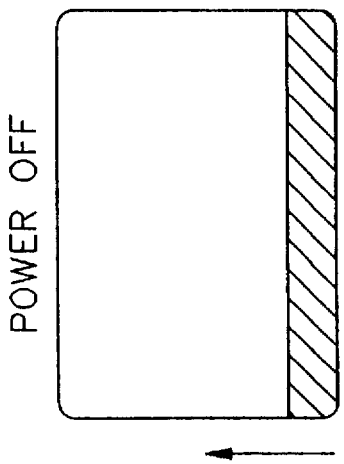
Figure 7A:
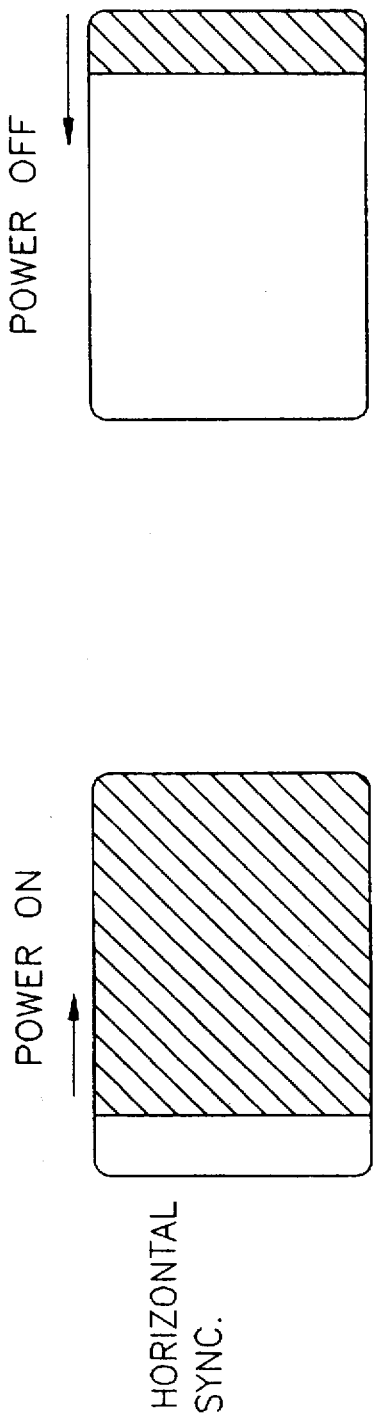
Figure 7C:
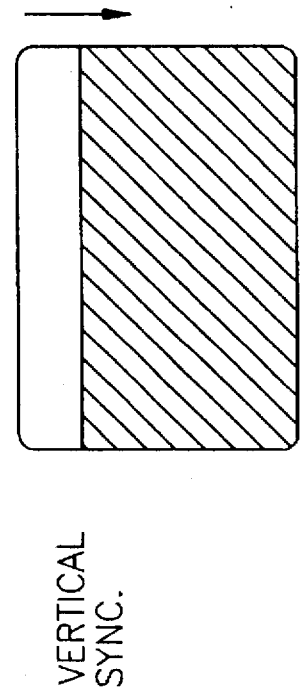
Figure 8:
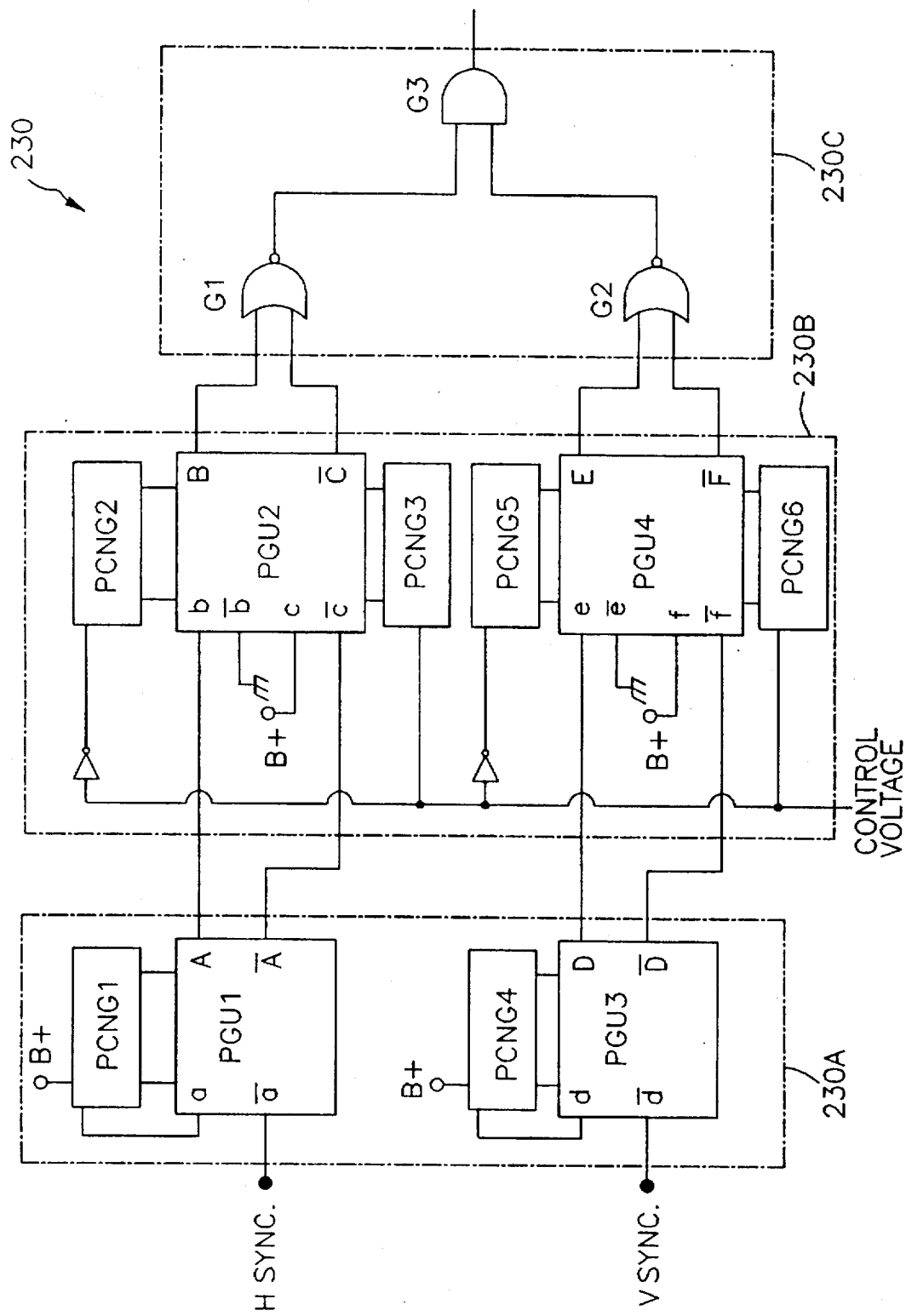
FIG. 8 shows a blanking control signal generating section according to the fifth embodiment of the present invention.
Figure 9:
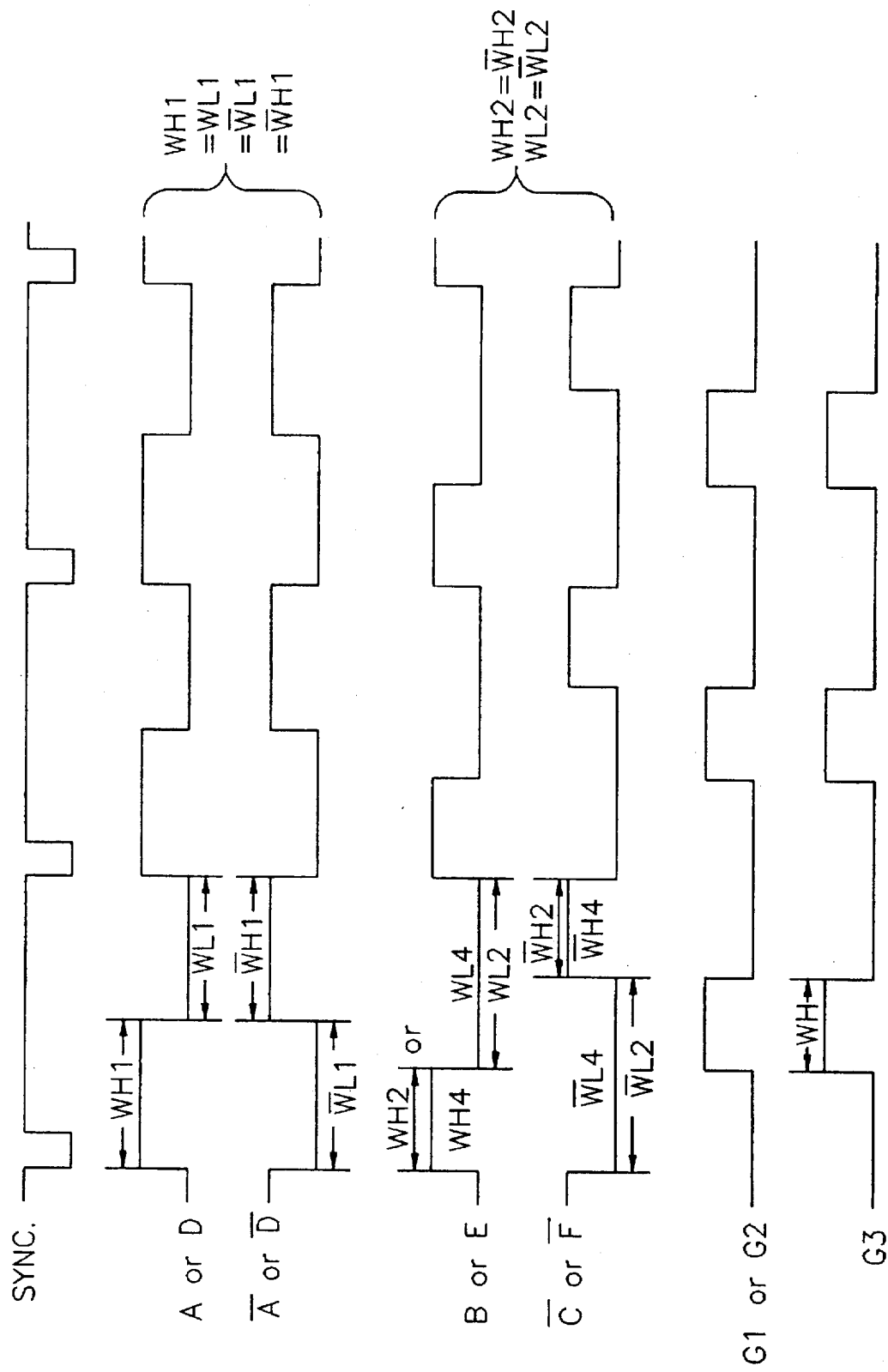
FIG. 9 shows a signal waveform of each output terminal of the blanking control signal generating section according to the fifth embodiment of the present invention.

The area displayed in the composite video signal controlling the blanking width in accordance with the switching on period is increased. The area displayed in the composite video signal shown in FIG. 7A is increased from the upper side to the bottom side of the screen in accordance with the construction and operation in FIG. 5 because of synchronizing the blanking control signal with the vertical synchronizing signal. Thus, a viewer has a feeling like opening the curtain from the upper side to the bottom side of the screen.

The high level width of the control voltage obtained from the integrator 220 is gradually increased till the screen size is full size. The blanking control signal generating section 230 generates the blanking control signal having the predetermined high level width because the high level width of the control voltage obtained from the integrator 220 has a predetermined value. Thus, video signal is displayed with full size in the screen.

On the other hand, if power of the wide television changes from the turn on state to the turn off state, the integrator 220 generates the control voltage having a linearly reduced magnitude for increasing the blanking width in accordance with controlling of MICOM 210. The blanking control signal generating section 230 outputs the blanking control signal whose high level width is linearly reduced in accordance with the control voltage. The switching on period of blanking control section 240 is gradually reduced in accordance with the blanking control signal. Thus, the screen is gradually closed from bottom side to upper side of the screen as shown in FIG. 7B. MICOM 210 has the control to break the power of wide television when the linearly reducing state of the PWM signal is finished.

In accordance with the third embodiment of the present invention as above description, the blanking width is increased or reduced in vertical direction in accordance with the blanking control signal synchronized with the vertical synchronizing signal when power of wide television is turned on or turned off. The third embodiment of the present invention as an opening or closing effect on the screen by changing the area of the displayed composite video signal because the blanking width is changed in a vertical direction.

The description of the construction and operation of the blanking control signal generating section 230 in the fourth embodiment of the present invention is omitted from this description because it is the same as the case of the third embodiment.

That is, the blanking control signal of the screen size control circuit in accordance with the fourth embodiment of the present invention is synchronized with the horizontal synchronizing signal. In accordance when the high level of the switching on period of blanking width controlling section 240 is increased, the blanking width is reduced from the left side of the screen to the right side of the screen and the displayed video area is increased. Thus, a viewer has a feeling like opening of the curtain from left side of the stage to right side of the stage.

On the other hand, if power of wide television is turned off, the blanking control signal which linearly reduced the high level width WH in accordance with controlling of MICOM 210 is generated. The switching on period of blanking control signal is gradually reduced. Thus, the blanking width in the screen is gradually increased from the right side of the screen to the left side of the screen and the video displaying area is reduced. MICOM 210 controls power when the linearly reducing state of the PWM signal is finished.

In accordance with the fourth embodiment of the present invention as in the above description, the blanking width is increased or reduced in horizontal direction in accordance with the blanking control signal synchronized with the horizontal synchronizing signal when power of wide television is turned on or turned off. The fourth embodiment of the present invention has an opening or closing effect of the screen by changing the area of the displayed composite video signal because the blanking width is changed in horizontal direction.

Blanking control section 230 of the fifth embodiment of the present invention comprises two pieces of the blanking control signal generating section in the first embodiment of the present invention and logic section. Each input signal of two pieces of the blanking control section includes the vertical synchronizing signal and the horizontal synchronizing signal. Logical section 230C comprises two pieces of NOR gate G1, G2, and a AND gate G3. Thus the description of the construction and operation of the fifth embodiment of the present invention is omitted from the below description because it is the same as the first embodiment of the present invention. That is, AND gate G3 in logic section 130C is used to obtain the blanking control signal by logical AND processing of the first blanking control signal synchronized with horizontal synchronizing signal and the second blanking control signal synchronized with vertical synchronizing signal.

In fifth embodiment of the present invention, the vertical blanking width in both sides of the screen and the horizontal blanking width in upper and bottom sides of the screen can be controlled by using the first blanking control signal synchronized with horizontal synchronizing signal and the second blanking control signal synchronized with vertical synchronizing signal. Thus, the fifth embodiment of the present invention has effects which are to open and close the screen in a horizontal direction by controlling the vertical blanking width in accordance with the first blanking control signal and to open and close the screen in a vertical direction by controlling the second blanking control signal. Especially, the video displayed in the screen when power is turned on or turned off is displayed by increasing or reducing the window having a rectangular shape due to generating the blanking control signal by logical OR processing of the first blanking control signal and the second blanking control signal.

The signal width determining sections from PCNG1 to PCNG6 are RC circuit. The signal width determining sections from PCNG1 to PCNG6 of the fifth embodiment have the same time constant. Thus, the blanking width can be controlled by reducing or increasing the same step in reference to the center of the screen. But, the time constant of each signal width determining sections from PCNG1 to PCNG6 can be changed by designer.

While the present invention has been particularly shown and described with reference to particular embodiments thereof, it will be understood by those skilled in the art that various changes in form and details may be effected therein without departing from the spirit and scope of the invention as defined by the appended claims. For example, the screen size control circuit in accordance with the present invention describes the case limited to a wide television, but the circuit is applicable to the general television having an aspect ratio 4:3.

What is claimed is:

1. A circuit for controlling a screen size of a television according to a state of power, comprising:
   a signal processing means for generating a composite video signal from a television broadcasting signal received from an antenna;
   a control signal generating means, including:
      a MICOM for generating a PWM signal increasing or decreasing linearly according to a power condition for controlling the screen size;
      an integrating means for generating said control voltage by integrating said PWM signal;
      a blanking control signal generating means for generating said blanking control signal synchronized by said synchronizing signal according to said control voltage, and
      a blanking width controlling means for generating said composite video signal controlled in said blanking width by inputting said blanking control signal and said composite video signal; and
   a display means for displaying said composite video signal controlled in said blanking width.

2. The circuit for controlling the screen size of the television according to the state of power as claimed in claim 1, wherein said signal processing means comprises:
   a video signal amplifying means for amplifying a signal having a predetermined magnitude for displaying said television signal received from said antenna in a screen;
   a synchronizing signal taking off means for detecting and dividing synchronizing signal from said amplified video signal; and a video signal processing means for generating said composite video signal processed in a magnitude and color of said video signal for displaying said amplified video signal in the screen.

3. The circuit for controlling the screen size of the television according to the power condition as claimed in claim 1, wherein said blanking control signal generating means comprises:

a first signal generating means for generating a first signal and an inverse first signal having a same signal width but a different polarity and synchronized by said synchronizing signal;

a second signal generating means for generating a second signal and an inverse second signal having a signal width determined according to said control voltage for controlling said blanking width; and a logic means for generating said blanking control signal by logical processing of said second signal and said inverse second signal.

4. The circuit for controlling the screen size of the television according to the power condition as claimed in claim 3, wherein said input signal of said first signal generating means is a horizontal synchronizing signal.

5. The circuit for controlling the screen size of the television according to the power condition as claimed in claim 3, wherein said input signal of said first signal generating means is a vertical synchronizing signal.

6. The circuit for controlling the screen size of the television according to the power condition as claimed in claim 3, wherein said first signal generating means comprises:

a first signal generating unit for generating said first signal and said inverse first signal synchronized by said synchronizing signal; and a first signal width determining means connected between said power and said first signal generating unit and for generating said first signal having a predetermined signal width.

7. The circuit for controlling the screen size of the television as claimed in claim 6, wherein said first signal width determining unit is an RC circuit.

8. The circuit for controlling the screen size of the television as claimed in claim 3, wherein said second signal generating means comprises:

a second signal generating unit for outputting said second signal and said inverse second signal by processing said first signal and said inverse first signal;

an inverting means for inverting said control voltage;

a second signal width determining means for determining a width of said second signal according to said inverse control voltage;

a third signal width determining means for determining a width of said inverse second signal according to said control voltage.

9. The circuit for controlling the screen size of the television as claimed in claim 8, wherein said second signal width determining means and said third signal width determining means are an RC circuit.

10. The circuit for controlling the screen size of the television as claimed in claim 8, wherein said second signal width determining means and said third signal width determining means have a same time constant.

11. The circuit for controlling the screen size of the television as claimed in claim 3, wherein said logic means generates said blanking control signal having high logic level when both logic levels of said second signal and said inverse second signal are logically low for changing said blanking width.

12. The circuit for controlling the screen size of the television as claimed in claim 3, wherein said first signal generating means comprises:

a first signal generating unit for generating said first signal and said inverse first signal synchronized by a horizontal synchronizing signal;

a first signal width determining means connected between said power and said first signal generating unit and for determining width of said first signal;

a third signal generating unit for generating a third signal and an inverse third signal synchronized by a vertical synchronizing signal; and a fourth signal width determining means connected between said power and said third signal generating unit and for determining width of said third signal.

13. The circuit for controlling the screen size of the television as claimed in claim 12, wherein said first signal width determining means and said fourth signal width determining means are an RC circuit.

14. The circuit for controlling the screen size of the television as claimed in claim 3, wherein said second signal generating means comprises:

a second signal generating unit for generating said second signal and said inverse second signal by processing said first signal and said inverse first signal;

a first inverting means for inverting said control voltage;

a third signal width determining means for determining said signal width of said inverse second signal according to said control voltage;

a fourth signal generating means for generating a fourth signal and an inverse fourth signal by processing said third signal and said inverse third signal;

a second inverting means for inverting said control voltage;

a fifth signal width determining means for determining a signal width of said fourth signal according to said inverse control voltage; and a sixth signal width determining means for determining signal width of said inverse fourth signal according to said control voltage.

15. The circuit for controlling the screen size of the television as claimed in claim 14, wherein said second signal width determining means, said third signal width determining means, said fifth signal width determining means, and said sixth signal width determining means are RC circuits.

16. The circuit for controlling the screen size of the television as claimed in claim 14, wherein said second signal width determining means, said third signal width determining means, said fifth signal width determining means, and said sixth signal width determining means have a same time constant.

17. The circuit for controlling the screen size of the television as claimed in claim 3, wherein said logic means comprises:

a first logic means for generating a first blanking control signal having a high logic level when both logic levels of said second signal and said inverse second signal are logically low for changing said blanking width in horizontal direction with reference to the vertical axis;

a second logic means for generating a second blanking control signal having a high logic level when both logic levels of said second signal and said inverse second signal are logically low for changing said blanking width in vertical direction with reference to the horizontal axis; and a third logic means for generating said blanking control signal for changing the shape of blanking by processing said first blanking control signal synchronized by the horizontal synchronizing signal and said second blanking control signal synchronized by the vertical synchronizing signal.

18. The circuit for controlling the screen size of the television as claimed in claim 1, wherein said blanking control signal generating means comprises:

a signal generating unit for generating said blanking control signal synchronized by said synchronizing signal; and a signal width determining means for determining signal width of said blanking control signal according to said control voltage.

19. The circuit for controlling the screen size of the television as claimed in claim 18, wherein said input signal of said signal generating unit is a horizontal synchronizing signal.

20. The circuit for controlling the screen size of the television as claimed in claim 18, wherein an input signal of said signal generating means is a vertical synchronizing signal.

21. The circuit for controlling the screen size of the television as claimed in claim 18, wherein said signal width determining means is an RC circuit.

22. A circuit for controlling the screen size of a television comprising:

a video signal amplifying means for amplifying said television signal having a predetermined magnitude for displaying said television signal received from an antenna in a screen;

a synchronizing signal taking off means for detecting and dividing a horizontal synchronizing signal from said amplified video signal; and a video signal processing means for generating a composite video signal processed in a magnitude and color of said video signal for displaying said amplified video signal in the screen;

a MICOM for generating a PWM signal increasing or decreasing linearly according to the power condition for controlling the screen size;

an integrating means for generating a control voltage by integrating said PWM signal;

a first signal generating unit for generating a first signal and an inverse first signal synchronized by said horizontal synchronizing signal;

a first signal width determining means connected between said power and said first signal generating unit and for generating said first signal having a predetermined signal width;

a second signal generating unit for outputting a second signal and an inverse second signal by processing said first signal and said inverse first signal;

an inverting means for inverting said control voltage;

a second signal width determining means for determining a width of said second signal according to said inverse control voltage;

a third signal width determining means for determining width of said inverse second signal according to said control voltage;

a NOR gate for generating a blanking control signal having high logic level when both logic levels of said second signal and said inverse second signal are logically low for changing said blanking width;

a blanking width controlling means for generating a composite video signal controlled in said blanking width by inputting said blanking control signal and said composite video signal;

a display means for displaying said composite video signal controlled in said blanking width; and said second signal width determining means and said third signal width determining means have a same time constant for variable changing said second signal and said inverse second signal with same width according to said control voltage.

23. A circuit for controlling the screen size of a television comprising:

a video signal amplifying means for amplifying said television signal having a predetermined magnitude for displaying said television signal received from an antenna in a screen;

a synchronizing signal taking off means for detecting and dividing a vertical synchronizing signal from said amplified video signal; and a video signal processing means for generating a composite video signal processed in a magnitude and color of said video signal for displaying said amplified video signal in the screen;

a MICOM for generating a PWM signal increasing or decreasing linearly according to the power condition for controlling the screen size;

an integrating means for generating a control voltage by integrating said PWM signal;

a first signal generating unit for generating a first signal and an inverse first signal synchronized by said vertical synchronizing signal;

a first signal width determining means connected between said power and said first signal generating unit and for generating said first signal having a predetermined signal width;

a second signal generating unit for outputting a second signal and an inverse second signal by processing said first signal and said inverse first signal;

an inverting means for inverting said control voltage;

a second signal width determining means for determining width of said second signal according to said inverse control voltage;

a third signal width determining means for determining width of said inverse second signal according to said control voltage;

a NOR gate for generating a blanking control signal having high logic level when both logic levels of said second signal and said inverse second signal are logically low for changing said blanking width;

a blanking width controlling means for generating a composite video signal controlled in said blanking width by inputting said blanking control signal and said composite video signal;

a display means for displaying said composite video signal controlled in said blanking width; and said second signal width determining means and said third signal width determining means have a same time constant for variably changing said second signal and said inverse second signal with same width according to said control voltage.

24. A circuit for controlling the screen size of a television comprising:

a video signal amplifying means for amplifying said television signal having a predetermined magnitude for displaying said television signal received from an antenna in a screen;

a synchronizing signal taking off means for detecting and dividing a horizontal synchronizing signal from said amplified video signal; and a video signal processing means for generating a composite video signal processed in a magnitude and color of said video signal for displaying said amplified video signal in the screen;

a MICOM for generating a PWM signal increasing or decreasing linearly according to the power condition for controlling the screen size;

an integrating means for generating a control voltage by integrating said PWM signal;

a signal generating unit for generating a first signal and an inverse first signal synchronized by said horizontal synchronizing signal;

a signal width determining means connected between said power and said signal generating unit and for generating said signal having a predetermined signal width;

a blanking width controlling means for generating a composite video signal controlled in said blanking width by inputting said blanking control signal and said composite video signal; and a display means for displaying said composite video signal controlled in said blanking width.

25. A circuit for controlling the screen size of a television comprising:

a video signal amplifying means for amplifying said television signal having a predetermined magnitude for displaying said television signal received from an antenna in a screen;

a synchronizing signal taking off means for detecting and dividing a vertical synchronizing signal from said amplified video signal; and a video signal processing means for generating a composite video signal processed in a magnitude and color of said video signal for displaying said amplified video signal in the screen;

a MICOM for generating a PWM signal increasing or decreasing linearly according to the power condition for controlling the screen size;

an integrating means for generating a control voltage by integrating said PWM signal;

a signal generating unit for generating a signal and an inverse signal synchronized by said vertical synchronizing signal;

a signal width determining means connected between said power and said signal generating unit and for generating said signal having a predetermined signal width;

a blanking width controlling means for generating a composite video signal controlled in said blanking width by inputting said blanking control signal and said composite video signal; and a display means for displaying said composite video signal controlled in said blanking width.

26. A circuit for controlling the screen size of a television comprising:

a video signal amplifying means for amplifying said television signal having a predetermined magnitude for displaying said television signal received from an antenna in a screen;

a synchronizing signal taking off means for detecting and dividing a horizontal and vertical synchronizing signal from said amplified video signal;

a video signal processing means for generating a composite video signal processed in a magnitude and color of said video signal for displaying said amplified video signal in the screen;

a MICOM for generating a PWM signal increasing or decreasing linearly according to the power condition for controlling the screen size;

an integrating means for generating a control voltage by integrating said PWM signal;

a first signal generating unit for generating a first signal and an inverse first signal synchronized by said horizontal synchronizing signal;

a first signal width determining means connected between said power and said first signal generating unit and for generating said first signal having a predetermined signal width;

a third signal generating unit for generating a third signal and an inverse third signal synchronized by said vertical synchronizing signal;

a fourth signal width determining means connected between said power and said third signal generating unit and for generating said third signal having a predetermined signal width;

a second signal generating unit for generating said second signal and said inverse second signal by processing said first signal and said inverse first signal;

a first inverting means for inverting said control voltage;

a second signal width determining means connected between said integrating means and said second signal generating unit and for generating width of said second signal according to said inverse control voltage;

a third signal width determining means for determining width of said inverse second signal according to said control voltage;

a fourth signal generating unit for generating a third signal and an inverse third signal by processing said third signal and said inverse third signal;

a second inverting means for inverting said control voltage;

a fifth signal width determining means for determining a signal width of said fourth signal according to said inverse control voltage;

a sixth signal width determining means for determining signal width of said inverse fourth signal according to said control voltage;

a first NOR gate for generating a first blanking control signal by logically processing of said second signal and said inverse second signal;

a second NOR gate for generating a second blanking control signal by logically processing said fourth signal and said fourth inverse signal;

an AND gate for generating a blanking control signal for changing the shape of blanking according to said first blanking control signal and said second blanking control signal;

a blanking width control means for generating a composite video signal controlled in said blanking width by inputting said blanking control signal and said composite video signal; and a display means for displaying said composite video signal controlled in said blanking width;

said second signal width determining means, said third signal width determining means, said fifth signal width determining means, and said sixth signal width determining means have a same time constant for variably changing said second signal and said inverse second signal with same width according to said control voltage.

* * * * *